United States Patent
Wisseman

(10) Patent No.: US 7,310,135 B2
(45) Date of Patent: Dec. 18, 2007

(54) SYSTEM AND METHOD FOR MONITORING AN OPTICAL FIBER

(75) Inventor: Philip Henry Wisseman, Austin, TX (US)

(73) Assignee: ATT Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 11/286,806

(22) Filed: Nov. 23, 2005

(65) Prior Publication Data
US 2007/0115456 A1    May 24, 2007

(51) Int. Cl.
*G01N 21/00* (2006.01)
(52) U.S. Cl. .................................. 356/73.1
(58) Field of Classification Search ............ None
See application file for complete search history.

(56) References Cited
U.S. PATENT DOCUMENTS
6,583,867 B1 *  6/2003  Jennings et al. ........... 356/73.1

2002/0101577 A1 *  8/2002  Thwing et al. ............ 356/73.1
2003/0174962 A1    9/2003  Poole et al.

\* cited by examiner

*Primary Examiner*—Tu T Nguyen
(74) *Attorney, Agent, or Firm*—G. Michael Roebuck

(57) ABSTRACT

A system and method are disclosed for monitoring a fiber optic network between a managed location and a remote location. In a particular embodiment of the method the monitoring wavelength signal is separated from the communication wavelength signal at the remote location and coupled on to the optical fiber carrying a communication wavelength signal from the remote location. In a particular embodiment of the system, the system includes a first optical filter for coupling a selected monitoring wavelength signal on to an optical fiber carrying a communication wavelength signal between the managed location and the remote location and a second optical filter at the managed location for recovering a permanently separated monitoring wavelength signal sent to the managed location from the remote location.

19 Claims, 6 Drawing Sheets

SYSTEM AND METHOD FOR MONITORING AN OPTICAL FIBER

BACKGROUND

1. Field of the Disclosure

The disclosure relates to the field optical fiber network signal monitoring and more specifically to efficiently monitoring a service provider's network as separate from customers' networked equipment.

2. Description of the Related Art

Optical fiber networks are susceptible to faults. It can be difficult to determine where a fault has occurred. Either a service provider or a customer can be responsible for a portion of the optical fiber network where a fault has occurred. Expensive equipment may be installed to locate faults. For example, resource intensive regeneration equipment or optical switches can be installed at various locations within an overall optical network to determine where a fault is located. Alternatively a network provider may dispatch maintenance crews to examine networks in detail to determine fault location and initiate repairs as necessary.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

DETAILED DESCRIPTION OF THE DRAWINGS

Figure 1:
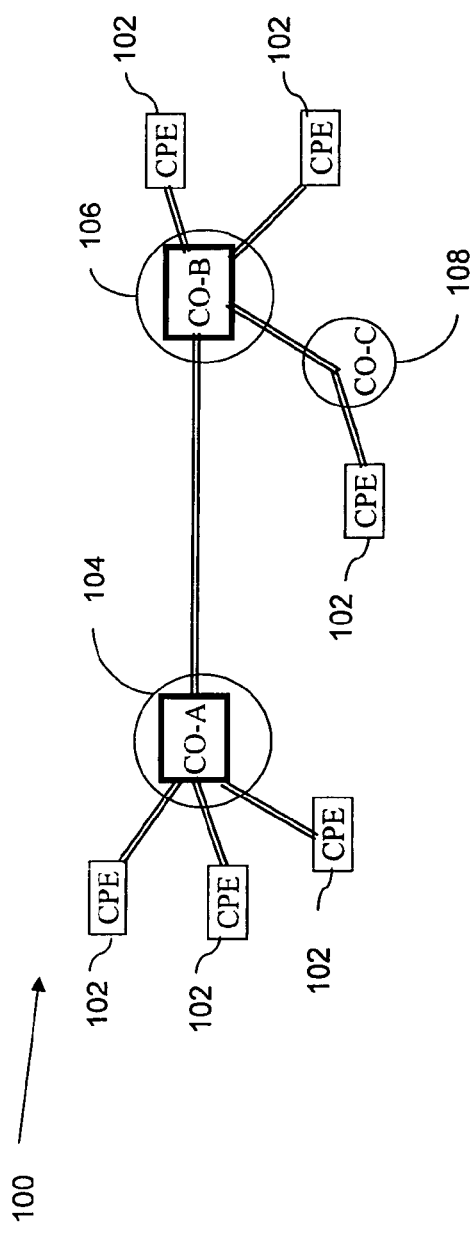
FIG. 1 illustrates a fiber optic network configuration that includes Customer Premises Equipment (CPE) networked to Central Offices (CO)

Methods and systems to monitor optical fibers and optical fiber networks are disclosed in an illustrative embodiment. These methods and systems are used to carry an optical monitoring signal between a managed location (e.g., a central office) and a remote location (e.g., a customer site or the demarcation between service provider equipment and a customer's equipment) and then back to managed location.

In one embodiment, a method is disclosed for monitoring an optical fiber network between a managed location and a remote location consisting of receiving concurrently at the remote location from the managed location, a monitoring wavelength signal and a communication wavelength signal over an optical fiber between the managed location and the remote location. In another particular embodiment the method further includes permanently separating the monitoring wavelength signal from the communication wavelength signal at the remote location, permanently coupling the monitor wavelength signal on to the optical fiber at the remote location, and sending the separated monitoring wavelength signal over the optical fiber from the remote location to the managed location. In another particular embodiment the remote location receives the monitoring wavelength signal over a first optical fiber, receives the communication wavelength signal over a second optical fiber and sends the separated monitoring wavelength signal over the second optical fiber. In another particular embodiment the communication wavelength signal and the monitoring wavelength signal are sent in opposite directions.

In another particular embodiment a method is disclosed that further consists of sending concurrently, from the managed location, a permanently coupled monitoring wavelength signal and a communication wavelength signal over an optical fiber between the managed location and the remote location, and receiving a permanently separated monitoring wavelength signal at the managed location from the remote location. In another particular embodiment the permanently separated monitoring wavelength signal is permanently separated from the communication wavelength signal at the remote location and the permanently separated monitor wavelength signal is permanently coupled on to the optical fiber at the remote location. In another particular embodiment the method further includes measuring a transmitted optical power value for the monitoring wavelength signal sent from the managed location and a received optical power value for the permanently separated monitoring wavelength signal received at the management location.

In another particular embodiment the method further includes determining an optical attenuation from a difference between the transmitted optical power value and the received optical power value. In another particular embodiment the monitor wavelength signal further includes sending over a first optical fiber, sending the communication wavelength signal over a second optical fiber and receiving the monitor wavelength signal over the second optical fiber. In another particular embodiment further includes sending the monitor wavelength signal in a first transmission direction and sending the communication wavelength signal in a second transmission direction, wherein the second transmission direction is opposite from the first transmission direction. In another particular embodiment the monitor wavelength signal is processed at the managed location by at least one selected from the set consisting of analog modulation, digital modulation, digital modulation with pseudo-random bit sequencing at the communication data rate and locking a wavelength for the monitoring wavelength signal.

In another particular embodiment, a system is presented for monitoring an optical fiber between a managed location and a remote location that includes an optical fiber placed between a managed location and the remote location, a first optical filter for permanently separating a monitoring wavelength signal from a communication wavelength signal received concurrently from the managed location at the remote location over the optical fiber, and a second optical filter at the remote location for permanently coupling the separated monitoring wavelength signal from on to the optical fiber at the remote location for sending the separated monitoring wavelength signal to the managed location. In another particular embodiment the system includes at least one of the set consisting of the first and second optical filters is passive. In another embodiment the system further includes a first and a second optical fiber, wherein the first optical fiber receives the communication wavelength signal and the second optical fiber sends the separated monitoring wavelength signal.

In another particular embodiment, the system further includes a first optical filter for coupling a selected monitoring wavelength signal on to the optical fiber carrying a communication wavelength signal between the managed location and the remote location and a second optical filter at the managed location for recovering a permanently separated monitoring wavelength signal sent on the optical fiber to the managed location from the remote location. In another particular embodiment, the system further includes a third optical filter for permanently separating the monitoring wavelength signal from the communication wavelength signal at the remote location and a fourth optical filter at the remote location for permanently coupling the monitor wavelength signal on to the optical fiber from the remote location.

In another particular embodiment, the system further includes a processor in the managed location, a computer readable medium accessible to the processor, and a computer program embedded within the computer readable medium. The computer program provides instructions to measure a transmitted optical power value for the monitoring wavelength signal, instructions to measure a received optical power value for the separated monitoring wavelength signal, and instructions to determine an optical attenuation from the transmitted and received optical power values. In another particular embodiment the computer program further includes instructions to determine an alarm condition based on the optical attenuation and a communication port for network access to optical attenuation values.

In another particular embodiment, a system is disclosed which consists of a first and second optical fibers, wherein the first optical fiber is used to send the communication wavelength signal and the second optical fiber is used to receive the monitoring wavelength signal. In another particular embodiment, the system sends the communication wavelength signal and the monitoring wavelength signals in opposite directions.

In one aspect of a particular embodiment a method is presented for an "Edge-less" configuration of monitoring an optical network. "Edge-less" monitoring for optical communications services may provide significant savings related to network maintenance. "Edge-less" monitoring enables elimination of expensive or resource intensive equipment at an interface with customer premises for monitoring whether a service provider network infrastructure has faults. Depending on the operational logistics and communication capabilities, however, operational disadvantages of the "Edge-less" configuration include the possibility for unnecessary service calls or "truck-rolls". These unnecessary "truck-rolls" are due to inability to distinguish between network and customer equipment problems. Delayed responses and communication outages to problems with fiber communications between Central Office (CO) and customer premises inspire customers to call to report problems and trucks will roll.

In view of the above, an illustrative embodiment is presented through one or more of its various aspects to provide one or more advantages, such as those noted below.

Figure 2:
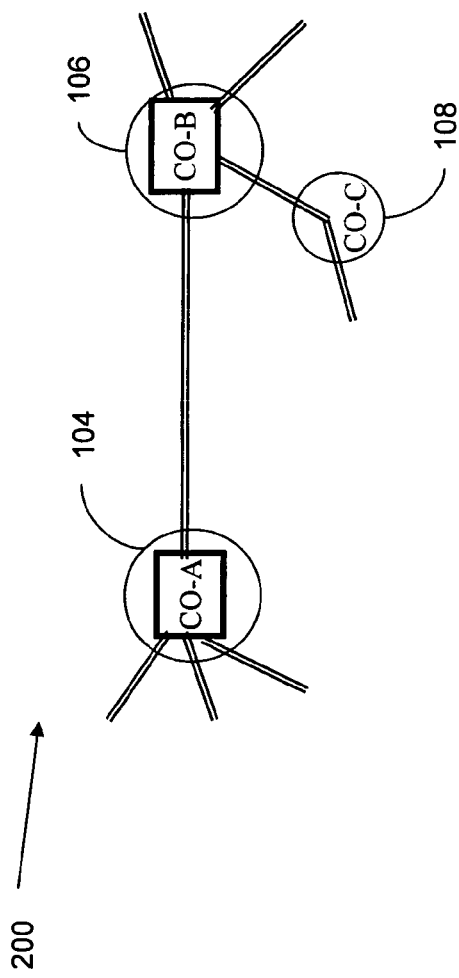
FIG. 2 is a schematic diagram depicting an illustrative embodiment showing the extent of a fiber optic service-provider network infrastructure configuration to be monitored.

FIG. 1 illustrates a fiber optic network 100 configuration that includes Customer Premises Equipment (CPE) 102 networked to Central Offices CO-A 104, CO-B 106 and CO-C 108. When CPEs include optical switches and ancillary monitoring equipment at a service provider to customer environment interface, the cost in equipment and maintenance can be high. FIG. 2 is a schematic diagram 200 depicting an illustrative embodiment showing the extent of a fiber optic service-provider network infrastructure configuration to be monitored.

Deployment of optical services in previous optical fiber network systems has utilized regeneration equipment (e.g., conversion of an optical signal to an electrical signal and conversion back to optical signal) placed at a customer site, which may be associated with CPEs as shown in FIG. 1. Regeneration equipment is sometimes termed 'active' equipment as it requires power for regeneration of the signal. This regeneration equipment, while located at the remote locations, is managed from the CO and often provides the ability to detect faults with the fiber and differentiate these fiber faults from faults or disconnects of the customer equipment. However, it is advantageous from a cost and resource perspective to initially provide optical services without placing active equipment at the customer site. This practice of not placing active equipment may serve to reduce cost and provide customers, vendors and suppliers with reduced space and power restrictions. Eliminating regeneration equipment does not, however, provide diagnostic capability to locate faults in a fiber optic network.

A direct optical interface to customer equipment, without the associated monitoring equipment, substantially eliminates the ability of a service provider to differentiate between service provider fiber network systems faults and other alarm or fault conditions that are caused or located within the customer environment. Inability to determine where faults occur may result in increased costs for personnel servicing dispatches and expending troubleshooting time. An optical loop-back device including optical switches at customer sites is costly and requires power at the customer site. A switching signal must also be applied to activate the optical switch. In contrast, aspects of several embodiments of the loop back methods and systems disclosed herein provide for monitoring the fiber to a remote location and for differentiating between service provider infrastructure fiber and customer equipment faults without requiring any power or a switching signal at the remote site directed to service provider fiber optic network system fault monitoring.

A particular illustrative embodiment provides monitoring of optical fibers to and from a remote location and differentiation between faults at the service provider infrastructure fiber and faults at the customer equipment. The illustrative embodiment does not require any power or switching at the remote customer site. An aspect of several particular embodiments of methods and systems disclosed is the use of a monitor wavelength, $\lambda_m$ that is different from communication wavelengths, $\lambda_c$. The monitor wavelength is passively looped back from the remote location at or near the network demarcation between the customer equipment and the service provider fiber network. This loop back enables monitoring functions to be performed from one managed end or node on the service provider's network link (e.g., at a CO).

Non-limiting embodiments of systems and methods present transport optical monitoring services at a lower cost than placing regeneration equipment at a remote customer site. These embodiments provide passive monitoring that substantially reduces increases in operational expenses when compared to an unmonitored fiber connection. Passive monitoring significantly lowers costs or resources compared to other optical loop-back test devices. In addition, by enabling a manageable direct optical interface to the customer site, the illustrative embodiment also supports shared multiplexing of various services thus reducing the transport costs between central offices.

Figure 3:
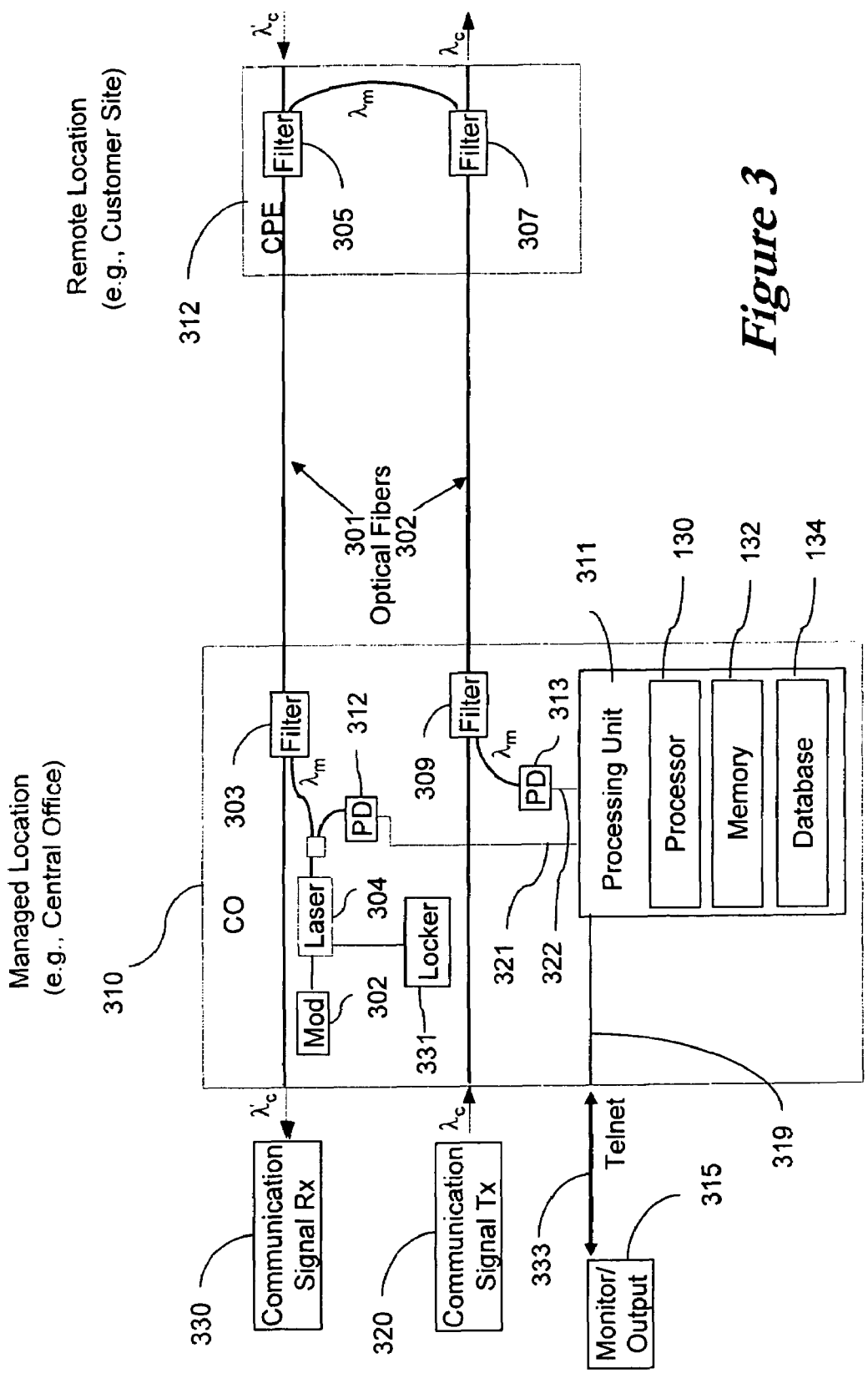
FIG. 3 illustrates a configuration of an embodiment provided for monitoring fiber optic networks between a CO and a remote location.

One non-limiting embodiment of a configuration 300 presented includes fiber optic link monitoring, as illustrated in FIG. 3. Optical fibers 301 connect a CO 310 with a remote location like a customer site 312. While the remote location is labeled CPE 312 in this figure, the significance is that this particular embodiment of a CPE 312 represents a demarcation between a service provider fiber optic network infrastructure and the customer equipment environment. Thus, the portion of the network monitored from the CO substantially includes just that portion of the network the service provider may be responsible to maintain.

In one aspect of a particular embodiment a method is presented for a modulating (using modulator 302) and monitoring (using monitor 315) a source laser 304 to supply a monitor wavelength signal to an optical filter 303. The filter couples the monitor wavelength signal, $\lambda_m$, onto a first optical fiber 301 which is also carrying communication wavelength signal, $\lambda_c$. At a remote location, for example a CPE 312, a similar optical filter 305 is used to separate $\lambda_m$ and $\lambda_c$. $\lambda_m$ is looped back and coupled onto a second optical fiber 302 using another optical filter 307. The second optical fiber line 302 may carry communication wavelength signal, $\lambda'_c$. The returned signal $\lambda_m$ (looped-back) is recovered from the second optical fiber 302 using another optical band pass filter 309 at the managed location. A pair of photo-detectors (PDs) 312, 313 are provided to measure the transmit 312 and receive 313 optical powers of the monitor wavelength signal. The difference between optical powers, $\lambda_m$ transmitted and $\lambda_m$ received is used to determine the optical attenuation at wavelength $\lambda_m$. While aspects of the illustrative embodiments disclosed utilize two optical fibers 303 and 307, one for carrying the monitoring wavelength to the remote location and a second optical fiber for carrying the monitoring wavelength back to the CO, it will be appreciated that one fiber may be used to carry the monitoring wavelength signal and communication wavelength signal in both directions.

In another aspect of a particular embodiment a method is disclosed for providing counter-propagating monitor wavelengths outside of telecom wavelength bands (e.g., 1625 nm in one non-limiting case). Modulation may be applied to improve loss measurement accuracy and extend transmission distance. Particular embodiments provide the ability to remotely measure the current optical fiber losses. Another embodiment provides options to also store a baseline loss. A historical measure of optical fiber loss may be indicative of pending failure. Several embodiments provide for differentiating between customer side problems and service provider fiber optic network communication problems.

Numerous variations on the configurations of these embodiments are possible, and the optimum design depends on the desired functionality and the cost and performance of the available components.

The monitor wavelength may be coupled in the same direction as the carrier wavelength (co-propagating) or in the opposite direction (counter-propagating). In one non-limiting embodiment the minimum return loss (power transmitted from the transmitter relative to power sent back into the transmitter) is 25 dB, while the crosstalk power difference to avoid interference losses in the co-propagating configuration may exceed 40 dB. FIG. 3 illustrates a communication wavelength transmit source 320 and a communication wavelength receive destination 330, where the monitoring wavelength is counter-propagating. The counter-propagating embodiment illustrated in FIG. 3 has advantages in terms of the optical isolation requirements for the filters, but the final selection depends on the loss and isolation characteristics of the optical filters and the relative transmit powers for signals $\lambda_m$ and $\lambda_c$. Whether co-propogating or counter-propagating embodiments are chosen will depend on filter characteristics and logistics, but either method provides passive monitoring of virtually an entire network segment from one end location.

The laser source 304 is used in another aspect of a particular embodiment illustrated in FIG. 3 to provide the monitor wavelength may be dedicated to a single fiber pair, shared among multiple fiber pairs using an optical splitter or switch, or alternatively the laser source may be located in association with an external source that is connected to a fiber port for manual testing.

In a particular embodiment, the monitor wavelength may be different than all current and anticipated potential future communication wavelengths. The optical fiber may carry more than one communication wavelength. In several embodiments, communication wavelength ranges are 770-860 mn (for multi-mode fiber), 1260-1360 nm, and 1430-1580 nm. Coarse Wave Division Multiplexing (CWDM) wavelengths may extend from 1270 nm to 1610 nm, or higher, in 20 nm steps. The selection of monitor wavelengths may depend on the desired transmission characteristics (modulation, receive sensitivity, etc.), fiber specifications, and the cost and performance of available lasers and optical filters. For various embodiments, communication wavelengths include the L-band (e.g., 1610 nm or 1625 nm) or reserving a CWDM wavelength for monitoring.

A wavelength locker 331 may be used with the laser source to reduce the required bandwidth of the optical filters. A laser source with a wavelength locker enables control of precise laser wavelengths and enables high-capacity dense Wavelength Division Multiplexing. Wavelength locking helps prevent laser wavelengths from drifting into adjacent channels and causing signal degradation.

The monitor wavelength may be continuous-wave or modulated using either analog or digital modulation. The continuous-wave option provides a simple optical loss measurement with minimal electronics. Analog modulation (e.g., with a single tone) allows AC coupling at the photo-detector and filtering to reduce the noise bandwidth and improve the receiver sensitivity. Digital modulation may provide additional coding gain to further increase sensitivity, or a pseudo-random bit sequence at the communication data rate can be applied to test bit-error-rate performance.

In another aspect of a particular embodiment a system and method for an internal laser source and continuous-wave operation, the transmit photo-detector can be a back-facet monitor photo-detector inside the laser module 304. This eliminates a possible need for an optical splitter and separate photo-detector to measure the transmit power.

Processing is provided by processing unit 311. Processing unit 311 includes processor 130 and memory 132. Memory 132 is coupled to processor 130. A database 134 is embedded in memory 132 and is accessible to processor 130. In a particular embodiment, the memory 132 can include a computer program that is embedded therein that can include logic instructions to perform one or more of the method steps described herein. The type of processing used for the outputs from the transmit 312 photo-detector and the receive photo-detector 313 depends on the option selected for modulation and the desired format of the monitor/output 315. Generally, the outputs 321,322 from the photo-detectors may be amplified, filtered, de-modulated, digitized, and subtracted (not necessarily in that order) to determine the fiber loss. This processing may be associated with processor unit 311. Additional processing may include comparing the current value with either a baseline value or threshold value determined at system installation.

Figure 4:
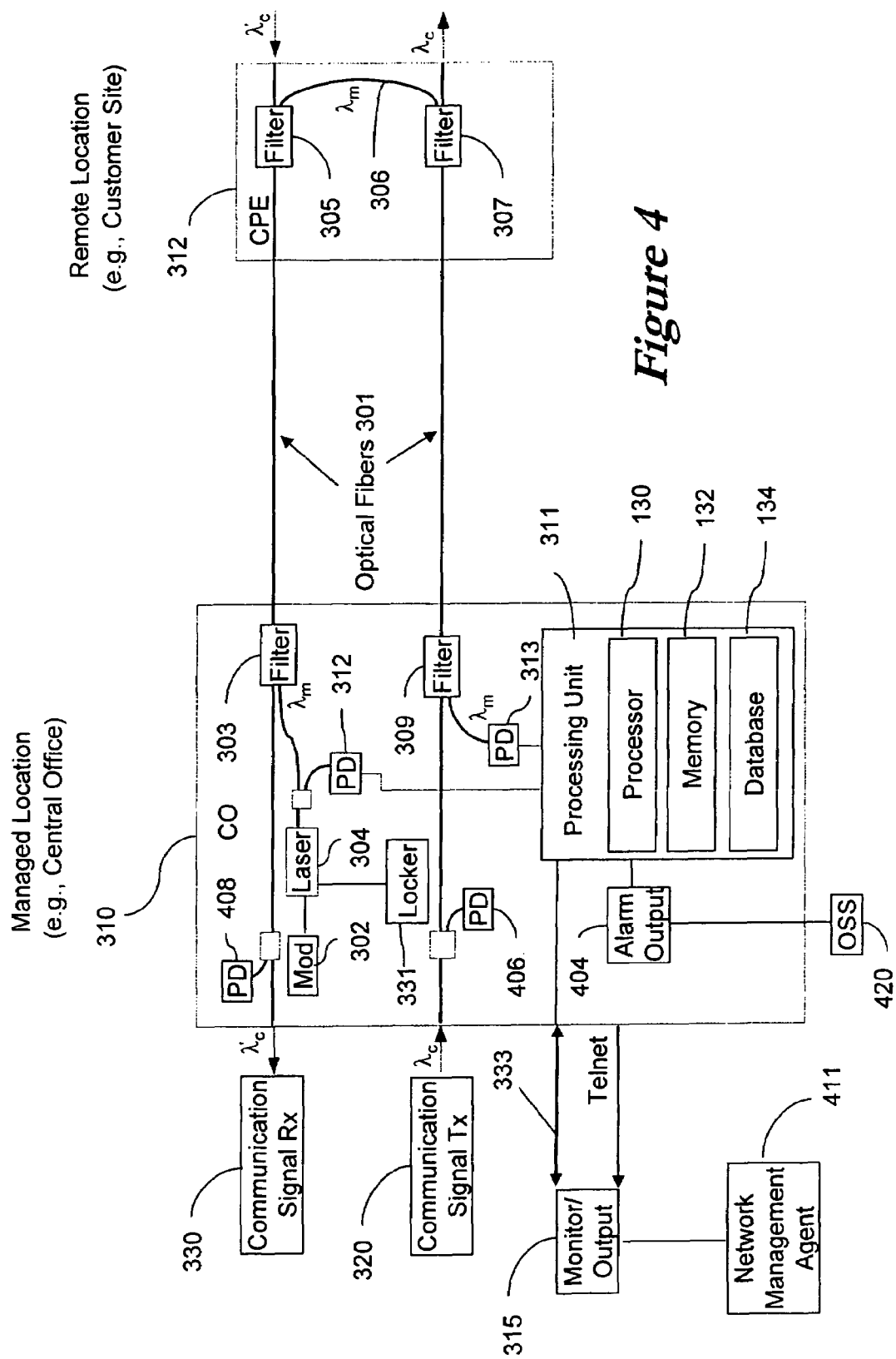
FIG. 4 illustrates a configuration of an embodiment provided for monitoring fiber optic networks between a CO and a remote location that includes alarm output and photodiode monitoring of transmit and receive communication power.

As illustrated in FIG. 4, the monitor output 315 may include an alarm output 404. In a non-limiting embodiment, the alarm message or alarm output may be sent to an Operational Support System (OSS) 420 either directly or via associated transport equipment. The alarm output may be a voltage to trigger an alarm relay or an analog or digital representation of the fiber attenuation. The alarm output may be used to reduce delays in responding to fiber fault problems. In another aspect of a particular embodiment of monitoring and/or alarm messaging provides for autonomous messaging to a Network Management Agent 411 when fiber monitoring is integrated with transport equipment. Alarms may occur on loss of signal or when a threshold value is attained, and these features are provisionable in particular embodiments.

In a particular embodiment monitor taps (i.e., 10% optical taps) and photo-detectors may be added to monitor the transmit power 406 and receive power 408 of the communication wavelength to allow detection of faults between this equipment and the transport equipment. For example, several aspects of particular embodiments present means for the detection and alarm signaling of conditions in the transmit direction (e.g., detection of laser or jumper faults). In another aspect of a particular embodiment a method is presented for providing troubleshooting alarms on transport equipment receivers when monitoring shows that outside plant fiber is operational (e.g., customer equipment or CO jumper). These additional photo-detectors combined with the communication channel 306 between filters 305 and 307 allow for further determinations of whether faults are occurring on the customer side of the CPE or in a service provider's fiber optic network infrastructure.

In another embodiment a system is presented wherein the provided monitoring operations may be optional. Options include continuous monitoring, sampled monitoring, or on-demand testing. Optical input and output ports can also be included in various embodiments to support the use of external test equipment (i.e., data protocol analyzer or Optical Time Domain Reflectometer) for testing the round-trip path at the monitor wavelength.

In another aspect of a particular embodiment a method is presented for retrieving optical energy loss data, or delivering system conditions to the output monitor 315 by communicating with the managed location using telnet or any other communications protocol in a communication port 333.

Figure 5:
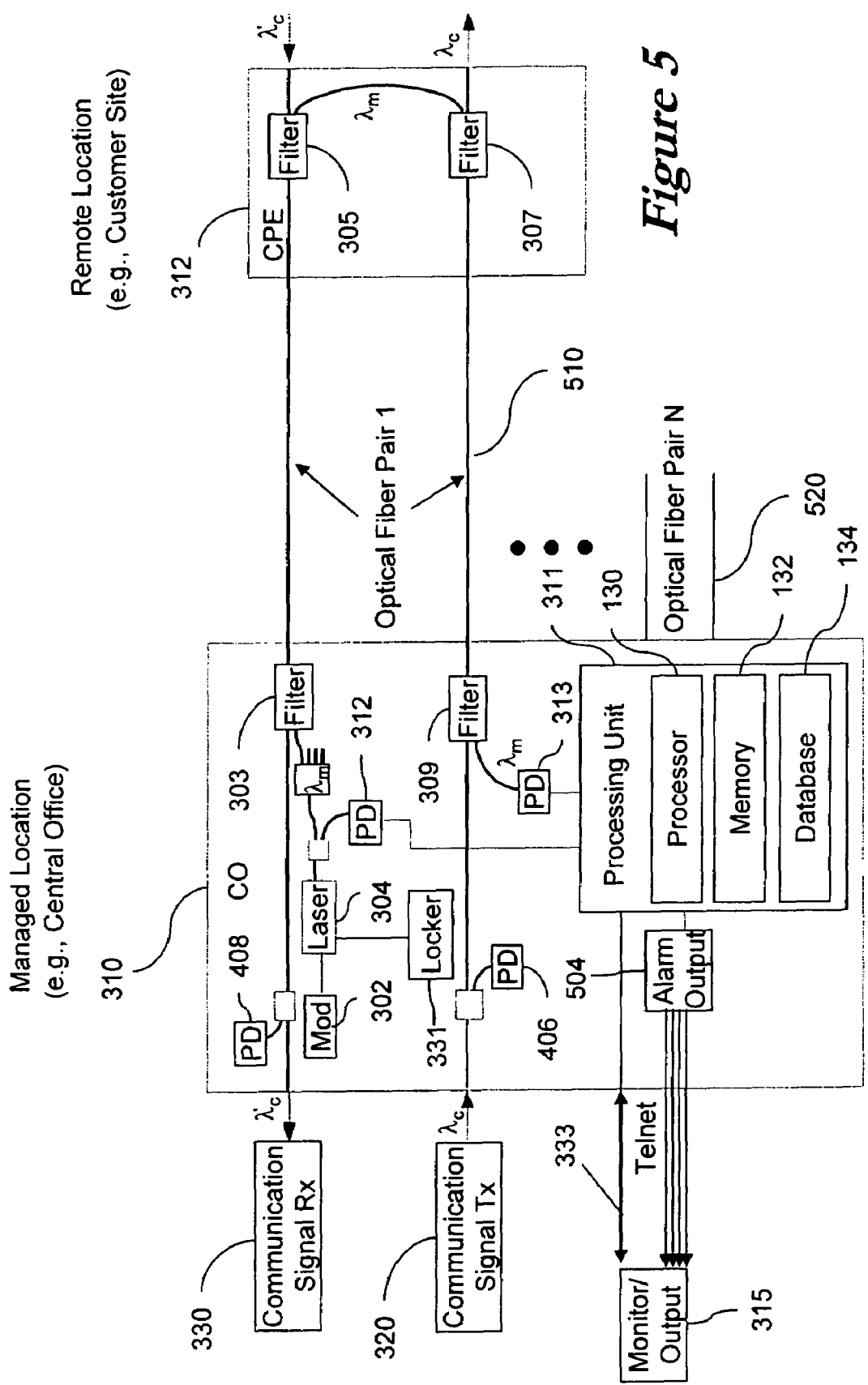
FIG. 5 illustrates a configuration of an embodiment provided for monitoring fiber optic networks between a CO and a remote location that includes multiple alarm outputs for multiple links of fiber optic pairs to the CO.

Turning now to FIG. 5, it may be appreciated that aspects of particular embodiments provide that a single laser source can be used to monitor multiple fiber links. Particular embodiments provide for single laser source monitoring Fiber Pair 1 510 through Fiber Pair N 520. Another particular embodiment provides that a laser source can be replaced without interrupting traffic over the network. In another aspect of a particular embodiment a system is presented for providing alarm output 504 which enables identification of specific fibers or fiber pairs sustaining signal losses.

Figure 6:
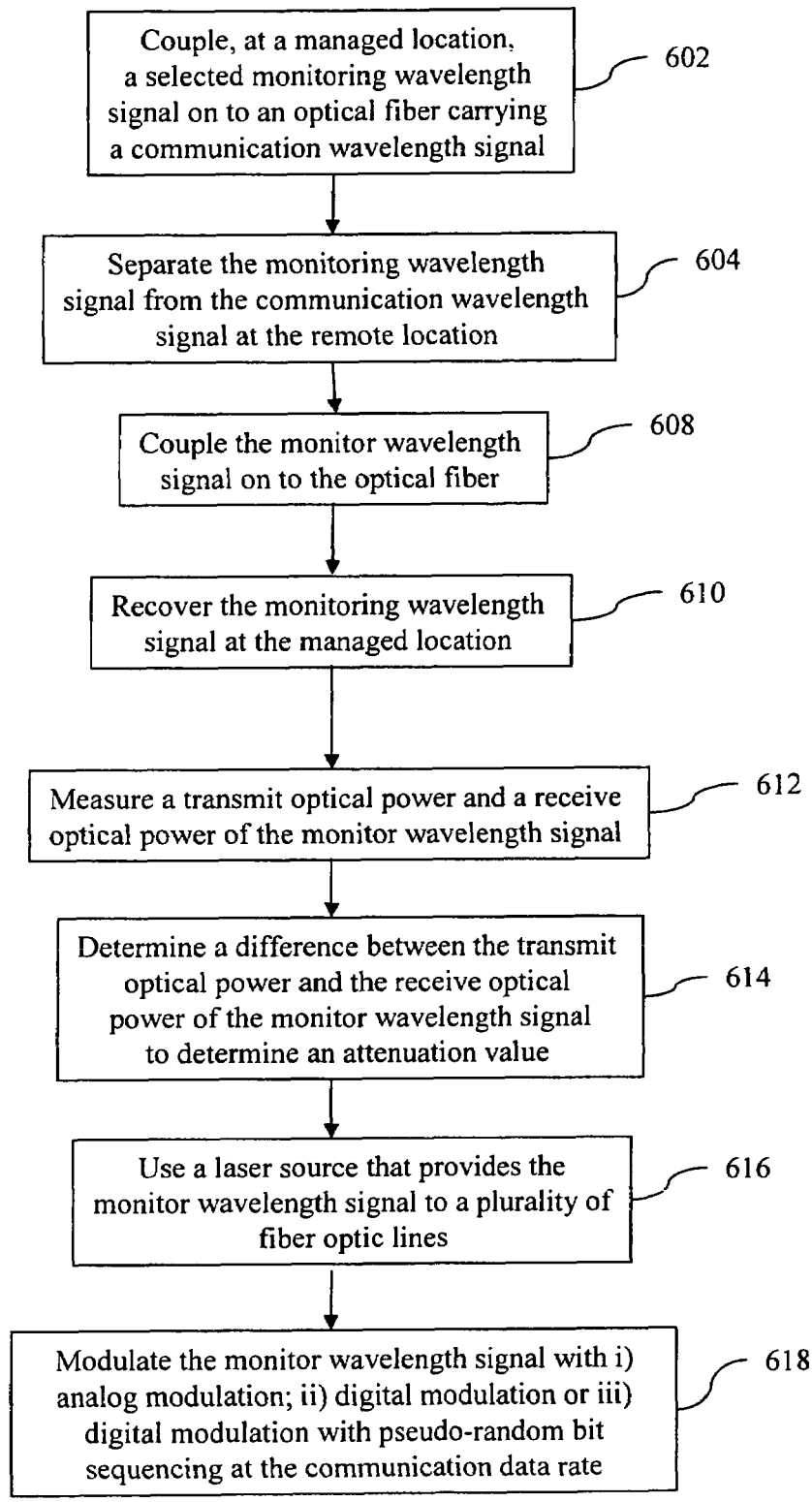
FIG. 6 is a flow chart illustrating an embodiment providing for monitoring a fiber optic network between a managed location and a remote location.

Turning now to FIG. 6, FIG. 6 is a flow chart illustrating an embodiment providing for monitoring a fiber optic network between a managed location and a remote location. A selected monitoring wavelength signal is coupled 602 onto an optical fiber carrying a communication wavelength signal. The monitoring wavelength signal is separated 604 from the communication wavelength signal at the remote location. The monitoring wavelength signal is coupled 608 onto the optical fiber, and then recovered 610 from the optical fiber at the managed location.

Additionally, the transmit optical power and the receive optical power of the monitor wavelength signal may be measured 612. A difference between the transmit optical power and the receive optical power of the monitor wavelength signal may be determined 614 for an attenuation value. A laser source may provide monitor wavelength signal to a plurality of fiber optic lines 616. The monitor wavelength signal may be modulated 618 with an analog signal, a digital signal or a digital signal with pseudo-random bit sequencing at the communication data rate.

Figure 7:
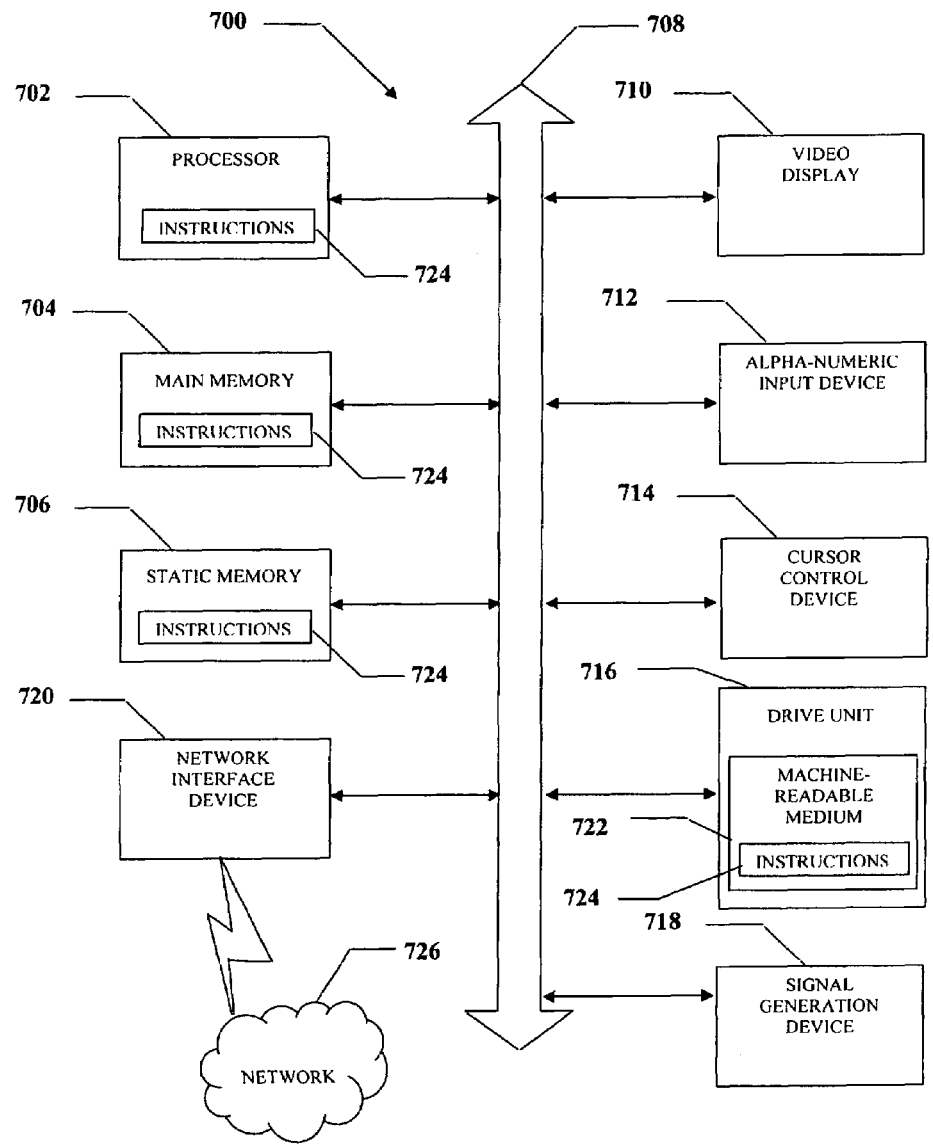
FIG. 7 is a diagrammatic representation of a machine in the form of a computer system within which a set of instructions, when executed, may cause the machine to perform any one or more of the methodologies of the illustrative embodiment.

Turning now to FIG. 7, FIG. 7 is a diagrammatic representation of a machine in the form of a computer system 700 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated in herein above. The instructions 724 may also reside, completely or at least partially, within the main memory 704, the static memory 706, and/or within the processor 702 during execution thereof by the computer system 700. The main memory 704 and the processor 702 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A method for monitoring an optical fiber between a managed location and a remote location, the method comprising:

receiving concurrently at the remote location from the managed location, a monitoring wavelength signal and a communication wavelength signal over an optical fiber between the managed location and the remote location;

passively separating without using electrical power for the separating the monitoring wavelength signal from the communication wavelength signal at the remote location;

passively coupling without using electrical power for the coupling the separated monitor wavelength signal on to the optical fiber at the remote location; and sending the separated monitoring wavelength signal over the optical fiber from the remote location to the managed location for monitoring at the managed location.

2. The method of claim 1, wherein the remote location receives the monitoring wavelength signal over a first optical fiber, receives the communication wavelength signal over a second optical fiber and sends the separated monitoring wavelength signal over the second optical fiber.

3. The method of claim 1, wherein the communication wavelength signal and the monitoring wave length signal are counter propagated opposite directions over the optical fiber thereby reducing optical isolation requirements for filters used for the passive separating and passive coupling.

4. A method for monitoring an optical fiber between a managed location and a remote location, the method comprising:

sending concurrently, from the managed location, a passively coupled monitoring wavelength signal and a communication wavelength signal between the managed location and the remote location wherein the passively coupled monitoring signal is coupled without requiring power for the coupling; and receiving the passively coupled monitoring wavelength signal at the managed location from the remote location.

5. The method of claim 4, wherein the passively separated monitoring wavelength signal is passively separated from the communication wavelength signal at the remote location and the passively separated monitor wavelength signal is passively coupled on to the optical fiber at the remote location wherein the communication wavelength signal and the monitoring wavelength counter propagate over the optical fiber in opposite directions.

6. The method of claim 4 further comprising:

measuring a transmitted optical power value for the monitoring wavelength signal sent from the managed location and a received optical power value for the passively separated monitoring wavelength signal received at the managed location.

7. The method of claim 6, further comprising:

determining an optical attenuation from a difference between the transmitted optical power value and the received optical power value.

8. The method of claim 4 wherein sending further comprises sending the monitoring wavelength signal over a first optical fiber, sending the communication wavelength signal over a second optical fiber and receiving further comprises receiving the monitor wavelength signal over the second optical fiber.

9. The method of claim 8, wherein sending further comprises sending the monitoring wavelength signal over a plurality of optical fibers including the first optical fiber, in a first transmission direction and sending the communication wavelength signal in a second transmission direction, wherein the second transmission direction is opposite from the first transmission direction.

10. The method of claim 4, wherein the monitor wavelength signal is processed at the managed location by at least one selected from the set consisting of analog modulation, digital modulation, digital modulation with pseudo-random bit sequencing at the communication data rate and locking a wavelength for the monitoring wavelength signal.

11. A system for monitoring an optical fiber between a managed location and a remote location, comprising:

an optical fiber placed between a managed location and a remote location;

a first optical filter without electrical power to the optical filter for passively separating a monitoring wavelength signal from a communication wavelength signal received concurrently in opposite directions from the managed location at the remote location over the optical fiber; and a second optical filter without electrical power to the optical filter at the remote location for passively coupling the separated monitoring wavelength signal on to the optical fiber at the remote location for sending the separated monitoring wavelength signal to the managed location.

12. The system of claim 11, wherein at least one of the set consisting of the first and second optical filters does not require switching.

13. The system of claim 11, wherein the optical fiber further comprises a first and a second optical fiber, wherein the first optical fiber receives the communication wavelength signal and the second optical fiber sends the separated monitoring wavelength signal.

14. A system for monitoring an optical fiber between a managed location and a remote location, comprising:

a first optical filter without electrical power for coupling a monitoring wavelength signal on to the optical fiber carrying a communication wavelength signal between the managed location and the remote location; and a second optical filter without electrical power at the managed location for recovering coupled monitoring wavelength signal sent on the optical fiber to the managed location from the remote location wherein the monitoring wavelength signal and the communication wavelength signal are counter propagated in opposite directions over the optical fiber.

15. The system of claim 14, further comprising:

a third optical filter at the remote location for passively separating the monitoring wavelength signal from the communication wavelength signal at the remote location; and a fourth optical filter at the remote location for passively coupling the monitoring wavelength signal on to the optical fiber from the remote location.

16. The system of claim 14 further comprising:

a processor in the managed location;

a computer readable medium accessible to the processor;

a computer program embedded within the computer readable medium, the computer program comprising:
instructions to measure a transmitted optical power value for a monitoring wavelength signal;
instructions to measure a counter propagated optical power value for a coupled wavelength signal; and
instructions to determine an optical attenuation from the transmitted and counter propagated optical power values.

17. The system of claim 14, wherein the computer program further comprises instructions to determine an alarm condition based on the optical attenuation.

18. The system of claim 14 further comprising:
a communication port for network access to optical attenuation values.

19. The system of claim 14, wherein the optical fiber further comprises a first and second optical fibers, wherein the first optical fiber is used to send the communication wavelength signal and the second optical fiber is used to receive the monitoring wavelength signal.

* * * * *